(12) United States Patent
Zhang et al.

(10) Patent No.: US 12,105,708 B2
(45) Date of Patent: Oct. 1, 2024

(54) COST-BASED SEMI-JOIN REWRITE

(71) Applicant: Teradata US, Inc, San Diego, CA (US)

(72) Inventors: Ming Zhang, Rolling Hills Estates, CA (US); Sanjay Nair, El Segundo, CA (US); Grace Kwan-On Au, Rancho Palos Verdes, CA (US); Mohammed Hussien Al-Kateb, Rolling Hills Estates, CA (US); Conrad Tang, Torrance, CA (US)

(73) Assignee: Teradata US, Inc., San Diego, CA (US)

( * ) Notice: Subject to any disclaimer, the term of this patent is extended or adjusted under 35 U.S.C. 154(b) by 286 days.

(21) Appl. No.: 17/566,442

(22) Filed: Dec. 30, 2021

(65) Prior Publication Data
US 2023/0214390 A1   Jul. 6, 2023

(51) Int. Cl.
*G06F 16/23* (2019.01)
*G06F 16/2453* (2019.01)

(52) U.S. Cl.
CPC .. *G06F 16/24544* (2019.01); *G06F 16/24545* (2019.01)

(58) Field of Classification Search
CPC .............. G06F 16/24545; G06F 16/24544
USPC .......................................... 707/714
See application file for complete search history.

(56) References Cited

U.S. PATENT DOCUMENTS

| 6,834,279 B1 * | 12/2004 | Chiang | G06F 16/24542 |
| | | | 709/227 |
| 2014/0067789 A1 * | 3/2014 | Ahmed | G06F 16/24544 |
| | | | 707/E17.017 |

* cited by examiner

*Primary Examiner* — Hosain T Alam
*Assistant Examiner* — Tracy M McGhee
(74) *Attorney, Agent, or Firm* — Gates & Cooper LLP (57) ABSTRACT

A method, apparatus, and computer program product for executing a relational database management system (RDBMS) in a computer system, wherein the RDBMS manages a relational database comprised of one or more tables storing data. The RDBMS executes a query with a semi-join operation comprising an inclusion join and/or an exclusion join performed against at least an outer table and an inner table, wherein the inclusion join returns a row from the outer table when there is a match with a row in the inner table, and the exclusion join returns a row from the outer table when there is no match with a row in the inner table. The RDBMS performs a rewrite of the query to avoid spooling and/or sorting of the inner table, when the inner table is larger than the outer table and a cost after the rewrite is lower than before the rewrite.

12 Claims, 8 Drawing Sheets

COST-BASED SEMI-JOIN REWRITE

BACKGROUND OF THE INVENTION

1. Field of the Invention

This invention relates to methods and systems for optimization in relational database management systems.

2. Description of Related Art

Computer systems implementing a relational database management system (RDBMS) are well known in the art. An RDBMS stores data as relational tables (also referred to as relations) comprised of rows and columns (also referred to as tuples and attributes, respectively), and uses a data manipulation language (DML), such as a structured query language (SQL), to create, update and access the data via user queries.

Semi-join operations are widely seen in user queries, as well as industry-standard benchmarks, such as performance tests of the independent Transaction Processing Performance Council (TPC) for data warehouse solutions and decision support systems, known as the TPC Benchmark H (TPC-H) and TPC Decision Support Benchmark (TPC-DS), respectively. For example, semi-joins are found in query 4, query 21 and query 22 of the TPC-H benchmark, and query 10, query 16, query 35, query 94 of the TPC-DS benchmark.

Semi-joins are also referred to as inclusion join and exclusion join: for inclusion join, an outer table row is returned if there is a match in the inner table; for exclusion join, an outer table row is returned if there is no match in the inner table. Note, however, in some literature, semi-join only refers to inclusion join and anti-join refers to exclusion join. In this document, semi-join is used to refer to inclusion join and/or exclusion join.

For some implementations of semi-join, pre-join sorting is used to remove duplicates (i.e., rows with the same value on the join column) from the inner table. A query execution plan would perform the following steps:

1. Retrieve rows from the inner table, sort on the join column and remove duplicates; and
2. Perform an inclusion and/or exclusion join of the outer table with the inner table.

Pre-join duplicate elimination helps reduce the cardinality of the inner table participating in the join. However, it is not always efficient to do that. When the inner table has a large number of rows (as compared to the outer table), the cost of the pre-join sort and duplicate elimination might be much higher than the cost saving in the join step.

For example, for the TPC-H and TPC-DS queries mentioned above, the cost of pre-join sorting and duplicate elimination step is very high and dominates the join cost; as a result, the query performance is not optimal. In these queries, the outer table is small (as compared to the inner table) and the join result is much smaller than the inner table. In this case, for inclusion join, post-join duplicate elimination is more efficient; for exclusion join, duplicate elimination is not necessary.

Thus, there is a need in the art for improved implementations of semi-joins for relational database management systems. The present invention satisfies this need.

SUMMARY OF THE INVENTION

The present invention discloses a method, apparatus, and computer program product for executing a relational database management system (RDBMS) in a computer system, wherein the RDBMS manages a relational database comprised of one or more tables storing data. The RDBMS executes a query with a semi-join operation comprising an inclusion join and/or an exclusion join performed against at least an outer table and an inner table, wherein the inclusion join returns a row from the outer table when there is a match with a row in the inner table, and the exclusion join returns a row from the outer table when there is no match with a row in the inner table. The RDBMS performs a rewrite of the query to avoid spooling and/or sorting of the inner table, when the inner table is larger than the outer table and a cost after the rewrite is lower than before the rewrite.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized, and structural changes may be made without departing from the scope of the present invention.

Overview

The present invention improves computer performance when performing semi-joins in a relational database management system. Specifically, a novel approach for a cost-based rewrite of semi-join (inclusion join and/or exclusion join) is provided, so that an optimizer of the relational database management system can produce a more efficient query execution plan that improves computer performance.

Hardware and Software Environment

Figure 1:
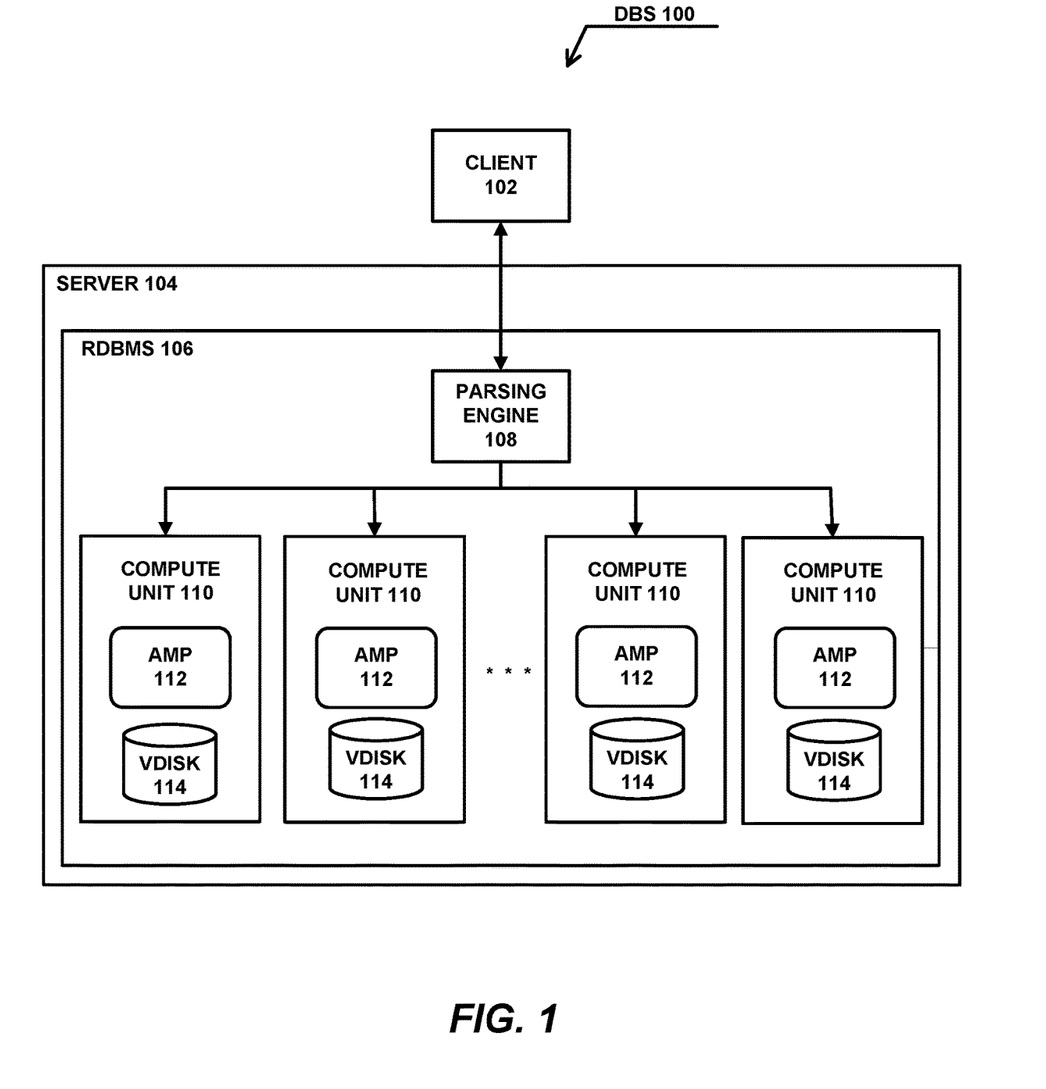
FIG. 1 illustrates an exemplary hardware and software environment according to one embodiment of the present invention.

FIG. 1 illustrates an exemplary hardware and software environment according to one embodiment of the present invention. In the exemplary environment, a database system (DBS) 100 is a computer system that implements a client-server architecture, wherein one or more client computers 102 may include, inter alia, a graphical user interface (GUI), which allows one or more users to interface with one or more server computers 104, which implement an RDBMS 106 that manages a relational database comprised of one or more tables storing data. The DBS 100 may be implemented in separate machines, or may be implemented as separate or related processes in a single machine.

In one embodiment, the RDBMS 106 includes a parsing engine (PE) 108 that organizes storage of the data and coordinates retrieval of the data from the storage, one or more compute units 110 executing one or more access module processors (AMPs) 112 performing the functions of the RDBMS 106, and one or more virtual disks (VDISKs) 114 storing the relational database of the RDBMS 106. The compute units 110 comprise processors, and the AMPs 112 and VDISKs 114 comprise processes that may be implemented in one or more separate machines or in a single machine.

The RDBMS 106 used in one embodiment comprises the Teradata® RDBMS sold by Teradata US, Inc., the assignee of the present invention, although other DBMS's could be used. In this regard, the Teradata® RDBMS is a hardware and software based data warehouse, decision support system, and data analytics system.

Generally, users of the system 100 interact with the client computers 102 to formulate requests for the RDBMS 106 executed by the server computers 104, wherein the requests access data stored in the RDBMS 106, and responses are received therefrom. In response to the requests, the RDBMS 106 performs the functions described below, including processing data retrieved from the RDBMS 106. Moreover, the results from these functions may be provided directly to the client computers 102, or may be provided to other computer systems (not shown), or may be stored by the RDBMS 106 in the relational database.

Note that, in one or more embodiments, the system 100 may use any number of different parallelism mechanisms to take advantage of the parallelism offered by the multiple tier architecture, the client-server structure of the client computers 102, server computers 104, RDBMS 106, PE 108, and the multiple compute units 110, AMPs 112 and VDISKs 114 of the RDBMS 106. Further, data within the relational database may be partitioned across multiple data storage devices to provide additional parallelism.

Generally, the client computers 102, server computers 104, RDBMS 106, PE 108, compute units 110, AMPs 112 and VDISKs 114 comprise hardware, such as computers, processors, data storage devices and networks, and software, such as instructions, logic and/or data tangibly embodied in and/or accessible from a device, media, or carrier, such as RAM, ROM, one or more of the data storage devices, and/or a remote system or device communicating with the DBS 100 via one or more of the networks, thereby making a computer program product or article of manufacture according to the invention. As such, the terms "article of manufacture," "program storage device" and "computer program product" as used herein are intended to encompass program instructions accessible from any computer readable storage medium. Accordingly, such articles of manufacture are readable by a computer system and the program instructions are executable by the computer system to cause the computer system to perform various method steps of the invention.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

Parsing Engine

Figure 2:
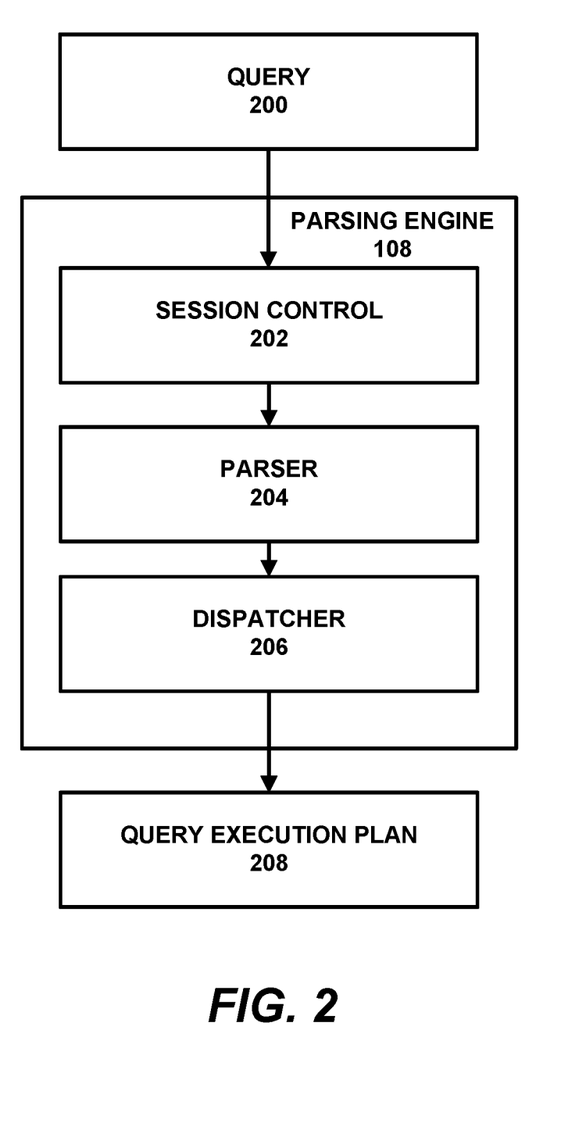
FIG. 2 illustrates an exemplary set of functions performed by a parsing engine when coordinating the retrieval of data in response to a query.

FIG. 2 further illustrates an exemplary set of functions performed by the PE 108 when coordinating the retrieval of data in response to a query 200. In one example, the PE 108 performs at least three functions: a session control 202, a parser 204, and a dispatcher 206. The session control 202 provides logon and logoff functions, and processes requests for access to the database. Once the session control 202 allows a request for access to the database to begin, the query 200 is routed to the parser 204, which interprets the query 200, and then to the dispatcher 206, which schedules and executes one or more resulting query execution plans 208 generated by the parser 204 using the AMPs 112 and VDISKs 114.

Figure 3:
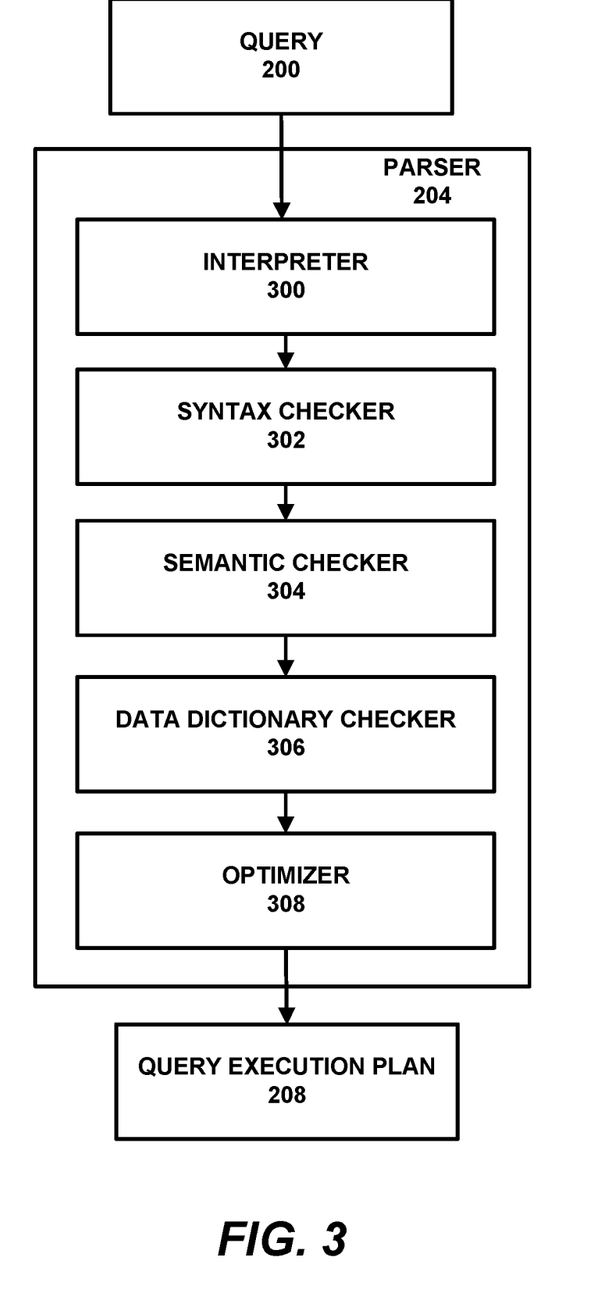
FIG. 3 illustrates an exemplary set of functions performed by a parser when interpreting a query.

FIG. 3 further illustrates an exemplary set of functions performed by the parser 204 when interpreting the query 200. An interpreter 300 interprets the query 200, a syntax checker 302 checks the query 200 for proper syntax, a semantic checker 304 evaluates the query 200 semantically, and a data dictionary checker 306 consults a data dictionary to ensure that all the data objects specified in the query 200 actually exist and that the user has the authority to access the data objects. Finally, an optimizer 308 generates one or more query execution plans 208 for the query 200 and selects an optimal query execution plan 208 (e.g., the least expensive plan) for the query 200, which is performed by the AMPs 112 and VDISKs 114.

Semi-Join Operations

As noted above, previous implementations of semi-join operations used pre-join sorting to remove duplicates (i.e., rows with the same value on a join column) from an inner table. A resulting query execution plan 208 would perform the following steps:

1. Retrieve rows from the inner table, sort on a join column, and remove duplicates; and
2. Perform an inclusion and/or exclusion join of an outer table with the inner table.

Pre-join duplicate elimination helps reduce the cardinality of the inner table participating in the join. However, it is not always efficient to do that, for example, when the inner table has a large number of rows as compared to the outer table. In such an instance, the cost of the pre-join sort and duplicate elimination might be much higher than any cost savings in the join step.

This invention proposes a cost-based query rewrite for a semi-join in a join planning phase of the optimizer 308 according to the following:

1. Rewrite a semi-join as follows:
    a. Rewrite an inclusion join as an inner join between the outer table and the inner table, followed by a post-join sort and duplicate elimination.
    b. Rewrite an exclusion join as a left outer join between the outer table and the inner table, with a post-join condition that the inner table's join column is null to select non-matching rows.
2. The optimizer 308 costs the query execution plans 208 for before-rewrite (i.e., the query execution plan 208 with a pre-join sort) and after-rewrite, and selects the query execution plan 208 with a lower cost for subsequent execution.

Test results show significant performance improvement for the relevant queries in TPC-H and TPCDS.

Cost-Based Query Rewrite

Query rewrite aims at rewriting a query 200 to semantically equivalent alternatives for better performance. Cost-based query rewrite estimates the cost of each equivalent alternative and selects the equivalent alternative with the lowest cost. However, cost-based query rewrite in existing RDBMS 106 is mainly limited to:
   a. equivalent transformations derived by join commutativity (i.e., switching left and right relations) and join associativity (i.e., different join orders); and
   b. rewrite by materialized view (i.e. join index in the Teradata® RDBMS 106).

The optimizer 308 in the Teradata® RDBMS 106 can perform an outer join rewrite, i.e., "table1 left-outer join table2" is rewritten to "table1 left-outer join (table1==table2)", based on semantic equivalence, but it is mainly a rule-based rewrite.

Cost-Based Semi-Join Rewrite

Semi-joins (including inclusion join and exclusion join) are used to filter a first table in a main query block by rows of a second table in a subquery Queries 200 with an IN/NOT IN or EXISTS/NOT EXISTS subquery use semi-join: an inclusion join for IN/EXISTS and an exclusion join for NOT IN/NOT EXISTS.

Example Using TPC-H Query 4

Consider TPC-H query 4 as an example to describe an inclusion join rewrite according to the present invention:

```
SELECT O_ORDERPRIORITY, COUNT(*) AS ORDER_COUNT
FROM ORDERTBL
WHERE SUBSTR(O_CLERK,15,1) BETWEEN '0' AND '4'
  AND O_ORDERDATE >= '1993-10-01'
  AND O_ORDERDATE < DATE '1993-10-01' + INTERVAL '3'
    MONTH
  AND EXISTS (
    SELECT *
    FROM LINEITEM
    WHERE L_ORDERKEY = O_ORDERKEY
    AND L_COMMITDATE < L_RECEIPTDATE )
GROUP BY O_ORDERPRIORITY
ORDER BY O_ORDERPRIORITY;
```

The above query returns rows from the ORDERTBL table that have an O_ORDERKEY matching an L_ORDERKEY in the LINEITEM table.

A typical query execution plan 208 of this query performs the following steps.
  1. Retrieve rows from the LINEITEM table, sort the rows on the join column L_ORDERKEY, and remove any duplicate rows with the same value for L_ORDERKEY.
  2. Perform ORDERTBL inclusion join LINEITEM.

However, such a query execution plan 208 is not efficient due to following:
   The LINEITEM table is a large table, and the single table condition on it is not very selective, therefore, the query execution plan 208 is sorting a large relation, and writing this large relation to spool (on disk) before performing the join.

This invention proposes to rewrite the inclusion join in a binary join planning phase of the optimizer 308, so that the optimizer 308 can select a new, more efficient, query execution plan 208 according to the following:
  1. Perform ORDERTBL inner join LINEITEM.
  2. Sort the join result on the join column and remove duplicates.

The new, more efficient, query execution plan 208 is much faster due to following:
   The outer table is relatively small and the single table condition on it is selective, thus the outer relation participating the join is small.
   The join result is small.

Obviously, these are data-dependent, the new, more efficient, query execution plan 208 is not always better on different data sets, so a cost-based rewrite is also proposed, namely:
  1. The optimizer 308 costs the query execution plans 208 for both before-rewrite and after-rewrite.
  2. The optimizer 308 selects the query execution plan 208 with a lower cost.

Figure 4A:
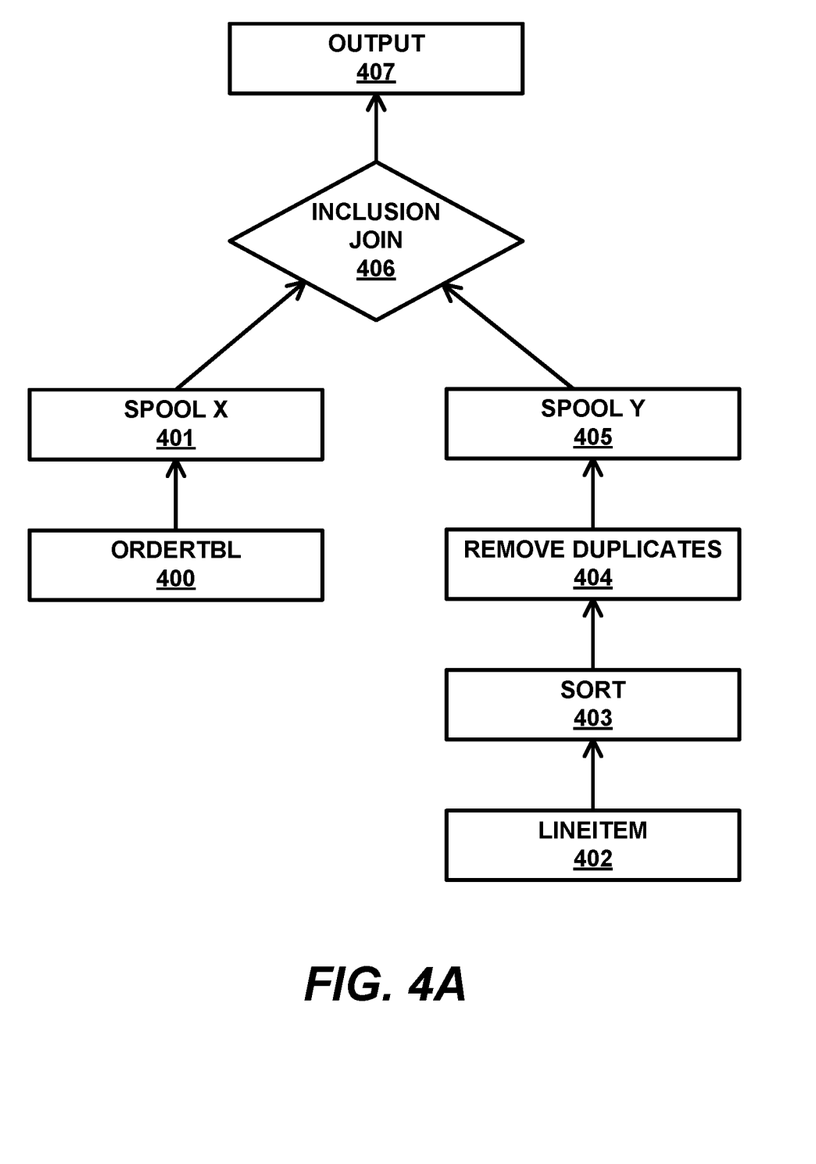
FIGS. 4A and 4B illustrate the differences in query execution plans of before-rewrite, as shown in FIG. 4A, and after-rewrite, as shown in FIG. 4B, for an inclusion join.
Figure 4B:
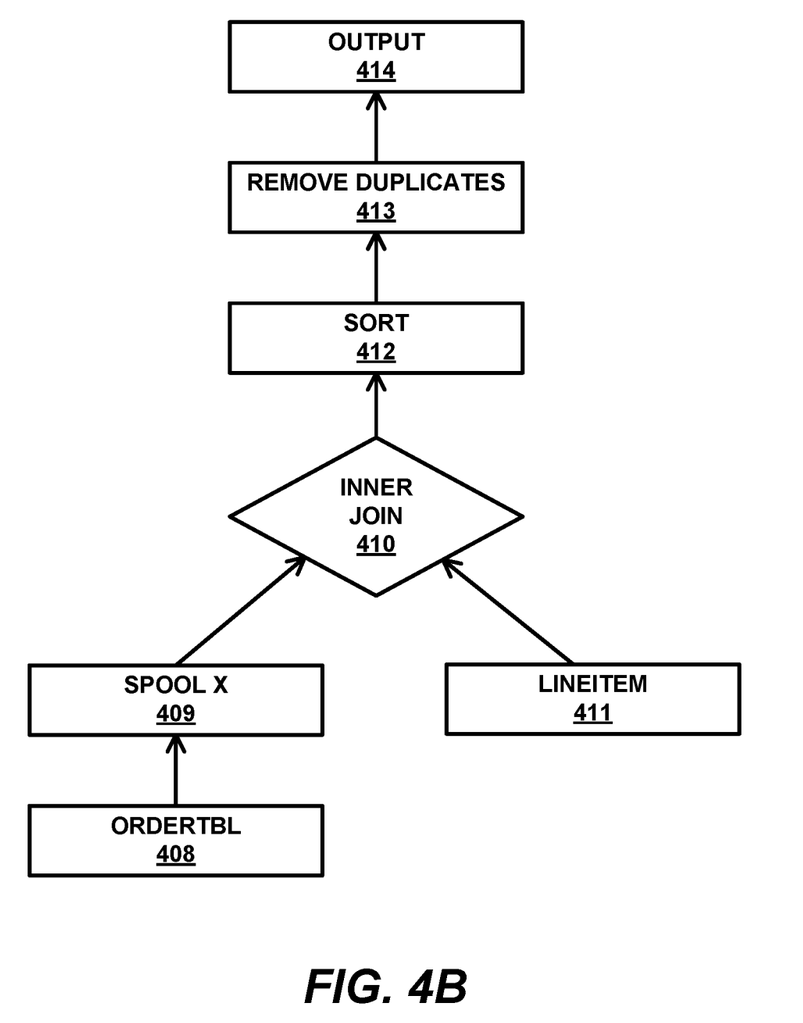

FIGS. 4A and 4B illustrate the differences in query execution plans 208 of before-rewrite, as shown in FIG. 4A, and after-rewrite, as shown in FIG. 4B, for an inclusion join.

In FIG. 4A, rows are read from ORDERTBL 400 and the rows are stored into SPOOL X 401. Rows are also read from LINEITEM 402, wherein the rows are sorted 403, duplicate rows are removed 404, and the resulting rows are stored into SPOOL Y 405. An inclusion join 406 is performed using the rows from SPOOL X 401 and SPOOL Y 405, with the resulting rows outputted 407.

In FIG. 4B, rows are read from ORDERTBL 408 and the rows are stored into SPOOL X 409. An inner join 410 is performed using the rows from SPOOL X 409 and LINEITEM 411, with the resulting rows sorted 412 and duplicate rows are removed 413, with the resulting rows outputted 414.

Example Using TPC-H Query 21

Consider TPC-H query 21 as an example to describe an exclusion join rewrite according to the present invention.

```
SELECT S_NAME, COUNT(*) AS NUMWAIT
FROM SUPPLIER, LINEITEM L1, ORDERTBL, NATION
WHERE EXTRACT(YEAR FROM L_SHIPDATE)=1995
  AND SUBSTR(O_CLERK,15,1) BETWEEN '0' AND '4'
  AND S_SUPPKEY = L1.L_SUPPKEY
  AND O_ORDERKEY = L1.L_ORDERKEY
  AND O_ORDERSTATUS='F'
  AND L1.L_RECEIPTDATE > L1.L_COMMITDATE
  AND EXISTS (
    SELECT *
    FROM LINEITEM L2
    WHERE L2.L_ORDERKEY = L1.L_ORDERKEY
    AND L2.L_SUPPKEY <> L1.L_SUPPKEY )
  AND NOT EXISTS (
    SELECT *
    FROM LINEITEM L3
    WHERE L3.L_ORDERKEY = L1.L_ORDERKEY
    AND L3.L_SUPPKEY <> L1.L_SUPPKEY
    AND L3.L_RECEIPTDATE > L1.L_COMMITDATE )
  AND S_NATIONKEY = N_NATIONKEY
  AND N_NAME = 'ALGERIA'
GROUP BY S_NAME
ORDER BY NUMWAIT DESC, S_NAME;
```

TPC-H query 21 has more outer tables and has both EXISTS and NOT EXISTS subqueries. For the NOT EXISTS subquery, a typical query execution plan 208 performs the following steps:
  1. Retrieve rows from the LINEITEM table, sort the rows on the join column L_ORDERKEY and remove duplicates.
  2. Perform <outer tables> exclusion join LINEITEM.

This query execution plan 208 is not efficient due to the high cost of join preparation.

This invention proposes to rewrite the exclusion join in a binary join planning phase of the optimizer 308 as a left outer join with an added IS NULL term on the join column, so that the optimizer 308 can select a new, more efficient, query execution plan 208 according to the following:
  1. Perform <outer tables> left outer loin LINEITEM
  2. Apply "LINEITEM.L_ORDERKEY is NULL" to the join result to obtain the non-matching rows.

The exclusion join rewrite is cost-based. The optimizer 308 costs the query execution plans 208 for both before-rewrite and after-rewrite, and selects the query execution plan 208 with a lower cost.

Figure 5A:
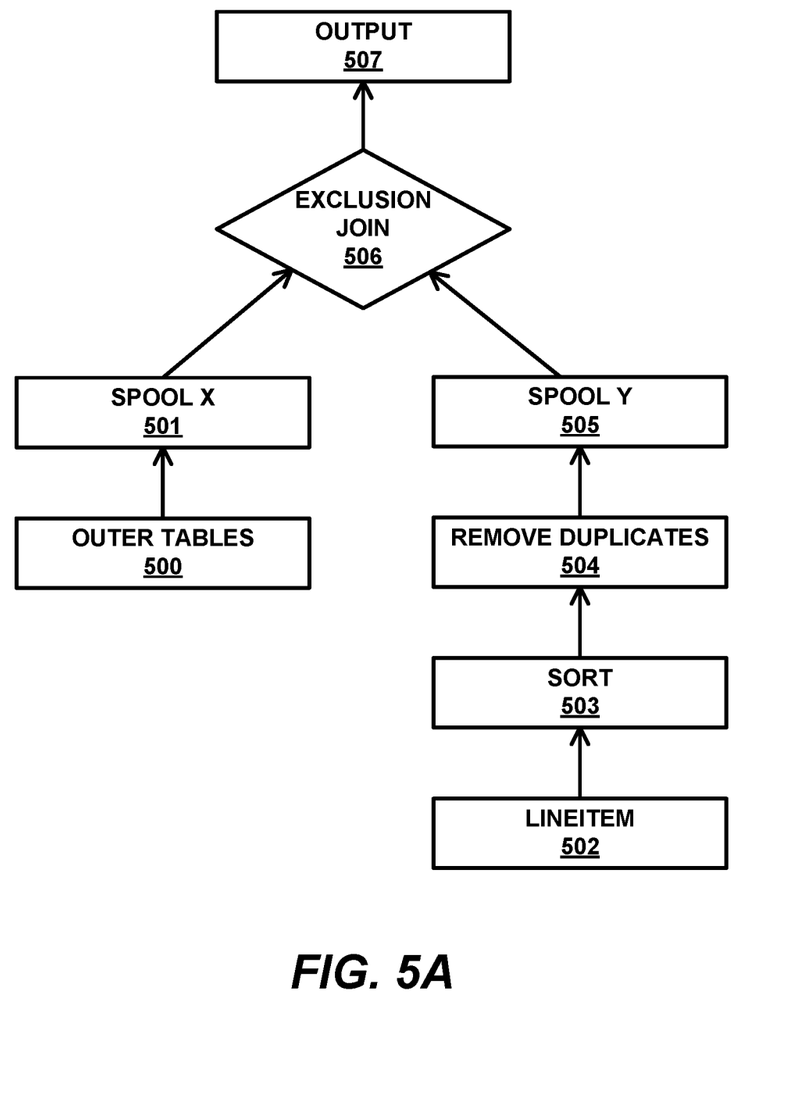
FIGS. 5A and 5B illustrate the differences in query execution plans of before-rewrite, as shown in FIG. 5A, and after-rewrite, as shown in FIG. 5B, for an exclusion join.
Figure 5B:
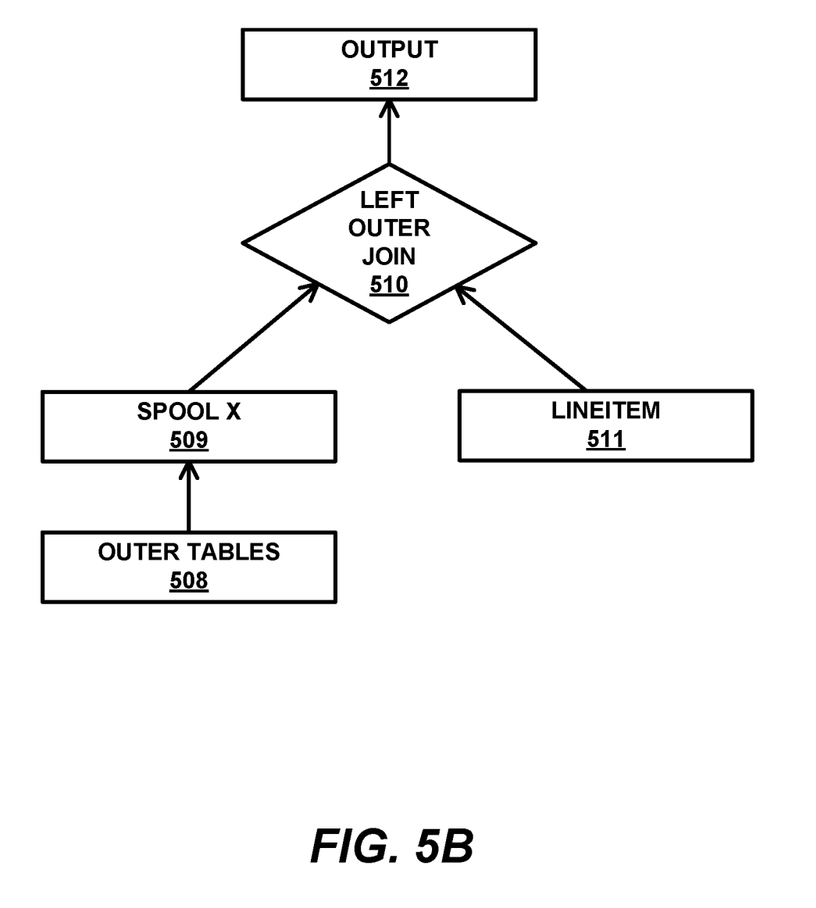

FIGS. 5A and 5B illustrate the differences in query execution plans 208 for before-rewrite, as shown in FIG. 5A, and after-rewrite, as shown in FIG. 5B, for an exclusion join.

In FIG. 5A, rows are read from the outer tables 500 and the rows are stored into SPOOL X 501. Rows are also read from LINEITEM 502, wherein the rows are sorted 503, duplicate rows are removed 504, and the resulting rows are stored into SPOOL Y 505. An exclusion join 506 is performed using the rows from SPOOL X 501 and SPOOL Y 505, with the resulting rows outputted 507.

In FIG. 5B, rows are read 510 from the outer tables 508 and the rows are stored into SPOOL X 509. A left outer join 510 with an added IS NULL term on the join column is performed using the rows from SPOOL X 509 and LINEITEM 511, with the resulting rows outputted 512.

Performance Improvement after Semi-Join Rewrite

The inclusion join rewrite and exclusion join rewrite were implemented and prototyped by the inventors, and experimental results were obtained on a 1 TB database. The following table shows the performance of relevant queries from TPC-H and TPC-DS using both the before-rewrite and after-rewrite query execution plans 208 described above for a semi-join.

|  | Before-rewrite - Execution elapsed time | After-rewrite - Execution elapsed time | Percentage reduction in execution elapsed time |
| --- | --- | --- | --- |
| TPC-H Query 4 | 95 seconds | 35 seconds | 63% |
| TPC-H Query 21 | 155 seconds | 73 seconds | 53% |
| TPC-H Query 22 | 38 seconds | 15 seconds | 60% |
| TPC-DS Query 16 | 69 seconds | 16 seconds | 76% |
| TPC-DS Query 94 | 36 seconds | 9 seconds | 75% |
| TPC-DS Query 10 | 800 seconds | 391 seconds | 51% |
| TPC-DS Query 35 | 1330 seconds | 694 seconds | 48% |

Flowchart

Figure 6:
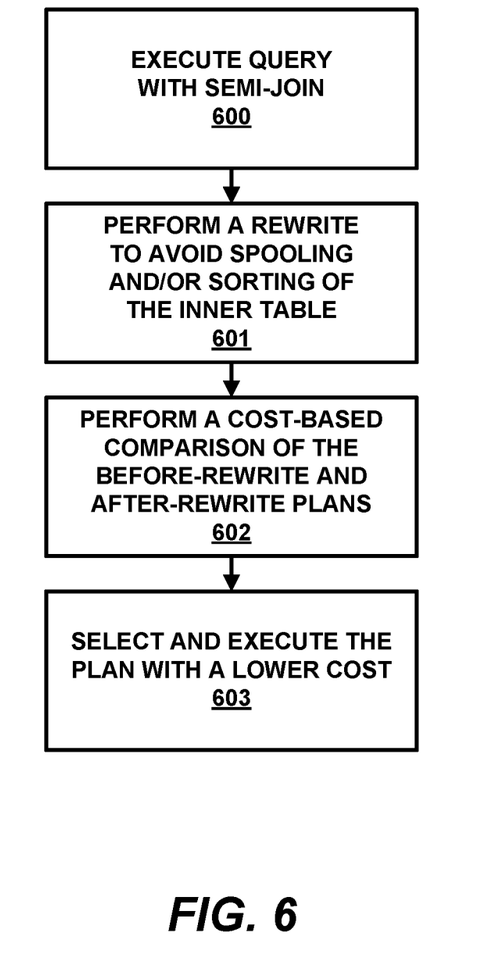
FIG. 6 is a flowchart that illustrates the steps performed in the present invention, when executing an RDBMS in a computer system, wherein the RDBMS manages a relational database comprised of one or more tables storing data.

FIG. 6 is a flowchart that illustrates the steps performed in the present invention, when executing an RDBMS 106 in a computer system 100, wherein the RDBMS 106 manages a relational database comprised of one or more tables storing data.

Block 600 represents the step of the RDBMS 106 executing a query 200 with a semi-join operation comprising an inclusion join and/or an exclusion join performed against at least an outer table and an inner table. The inclusion join returns a row from the outer table, when there is a match with a row in the inner table, while the exclusion join returns a row from the outer table, when there is no match with a row in the inner table. The inclusion join is with a correlated EXISTS or a non-correlated IN condition in a SQL query 200, while the exclusion join is with a correlated NOT EXISTS or a non-correlated NOT IN condition in a SQL query 200.

Block 601 represents the step of the RDBMS 106 performing a rewrite of the query 200 to avoid spooling and/or sorting of the inner table, when the inner table is larger than the outer table and a cost after the rewrite is lower than before the rewrite. Specifically, the RDBMS 106 may perform one or more of the following rewrites:

a. the RDBMS 106 performs a rewrite of the inclusion join to perform an inner join between the outer table and the inner table, along with a post-join sort and duplicate elimination.

b. the RDBMS 106 performs a rewrite of the exclusion join to perform a left outer join between the outer table and the inner table, with a post-join condition that the inner table's join column is null to select non-matching rows.

Block 602 represents the step of the RDBMS 106 performing a cost-based comparison between a first query execution plan 208 for the query 200 and a second query execution plan 208 for the rewrite of the query 200.

Block 603 represents the step of the RDBMS 106 selecting and executing either the first or second query execution plan 208 with a lower cost.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method, comprising:
   executing a relational database management system (RDBMS) in a computer system, wherein:
   the RDBMS manages a relational database comprised of one or more tables storing data;
   the RDBMS executes a query with a semi-join operation comprising an inclusion join and/or an exclusion join performed against at least an outer table and an inner table;
   the inclusion join returns a row from the outer table when there is a match with a row in the inner table;
   the exclusion join returns a row from the outer table when there is no match with a row in the inner table; and
   the RDBMS performs a rewrite of the query to avoid spooling and/or sorting of the inner table, when the inner table is larger than the outer table and a cost after the rewrite is lower than before the rewrite, wherein:
   when the query includes the inclusion join, the RDBMS rewrites the query to perform an inner join between the outer table and the inner table, followed by a post-join sort and duplicate elimination; and
   when the query includes the exclusion join, the RDBMS rewrites the query to perform a left outer join between the outer table and the inner table, with a post-join condition that the inner table's join column is null to select non-matching rows.

2. The method of claim 1, wherein the RDBMS performs a cost-based comparison between a first query execution plan for the query and a second query execution plan for the rewrite of the query, and the RDBMS selects either the first or second query execution plan with a lower cost for subsequent execution.

3. The method of claim 1, wherein the inclusion join is with a correlated EXISTS or a non-correlated IN condition in a structured query language (SQL) statement interpreted by the RDBMS.

4. The method of claim 1, wherein the exclusion join is with a correlated NOT EXISTS or a non-correlated NOT IN condition in a structured query language (SQL) statement interpreted by the RDBMS.

5. An apparatus, comprising:
a computer executing a relational database management system (RDBMS), wherein:
the RDBMS manages a relational database comprised of one or more tables storing data;
the RDBMS executes a query with a semi-join operation comprising an inclusion join and/or an exclusion join performed against at least an outer table and an inner table;
the inclusion join returns a row from the outer table when there is a match with a row in the inner table;
the exclusion join returns a row from the outer table when there is no match with a row in the inner table; and
the RDBMS performs a rewrite of the query to avoid spooling and/or sorting of the inner table, when the inner table is larger than the outer table and a cost after the rewrite is lower than before the rewrite, wherein:
when the query includes the inclusion join, the RDBMS rewrites the query to perform an inner join between the outer table and the inner table, followed by a post-join sort and duplicate elimination; and
when the query includes the exclusion join, the RDBMS rewrites the query to perform a left outer join between the outer table and the inner table, with a post-join condition that the inner table's join column is null to select non-matching rows.

6. The apparatus of claim 5, wherein the RDBMS performs a cost-based comparison between a first query execution plan for the query and a second query execution plan for the rewrite of the query, and the RDBMS selects either the first or second query execution plan with a lower cost for subsequent execution.

7. The apparatus of claim 5, wherein the inclusion join is with a correlated EXISTS or a non-correlated IN condition in a structured query language (SQL) statement interpreted by the RDBMS.

8. The apparatus of claim 5, wherein the exclusion join is with a correlated NOT EXISTS or a non-correlated NOT IN condition in a structured query language (SQL) statement interpreted by the RDBMS.

9. A computer program product, the computer program product comprising a computer readable storage medium having program instructions accessible therefrom, the program instructions executable by a computer system to cause the computer system to perform a method, comprising:
executing a relational database management system (RDBMS) in a computer system, wherein:
the RDBMS manages a relational database comprised of one or more tables storing data;
the RDBMS executes a query with a semi-join operation comprising an inclusion join and/or an exclusion join performed against at least an outer table and an inner table;
the inclusion join returns a row from the outer table when there is a match with a row in the inner table;
the exclusion join returns a row from the outer table when there is no match with a row in the inner table; and
the RDBMS performs a rewrite of the query to avoid spooling and/or sorting of the inner table, when the inner table is larger than the outer table and a cost after the rewrite is lower than before the rewrite, wherein:
when the query includes the inclusion join, the RDBMS rewrites the query to perform an inner join between the outer table and the inner table, followed by a post-join sort and duplicate elimination; and
when the query includes the exclusion join, the RDBMS rewrites the query to perform a left outer join between the outer table and the inner table, with a post-join condition that the inner table's join column is null to select non-matching rows.

10. The computer program product of claim 9, wherein the RDBMS performs a cost-based comparison between a first query execution plan for the query and a second query execution plan for the rewrite of the query, and the RDBMS selects either the first or second query execution plan with a lower cost for subsequent execution.

11. The computer program product of claim 9, wherein the inclusion join is with a correlated EXISTS or a non-correlated IN condition in a structured query language (SQL) statement interpreted by the RDBMS.

12. The computer program product of claim 9, wherein the exclusion join is with a correlated NOT EXISTS or a non-correlated NOT IN condition in a structured query language (SQL) statement interpreted by the RDBMS.

* * * * *